June 6, 1944.　　　　L. D. MARTIN　　　　2,350,788
GEAR TESTING TOOL
Filed March 4, 1943
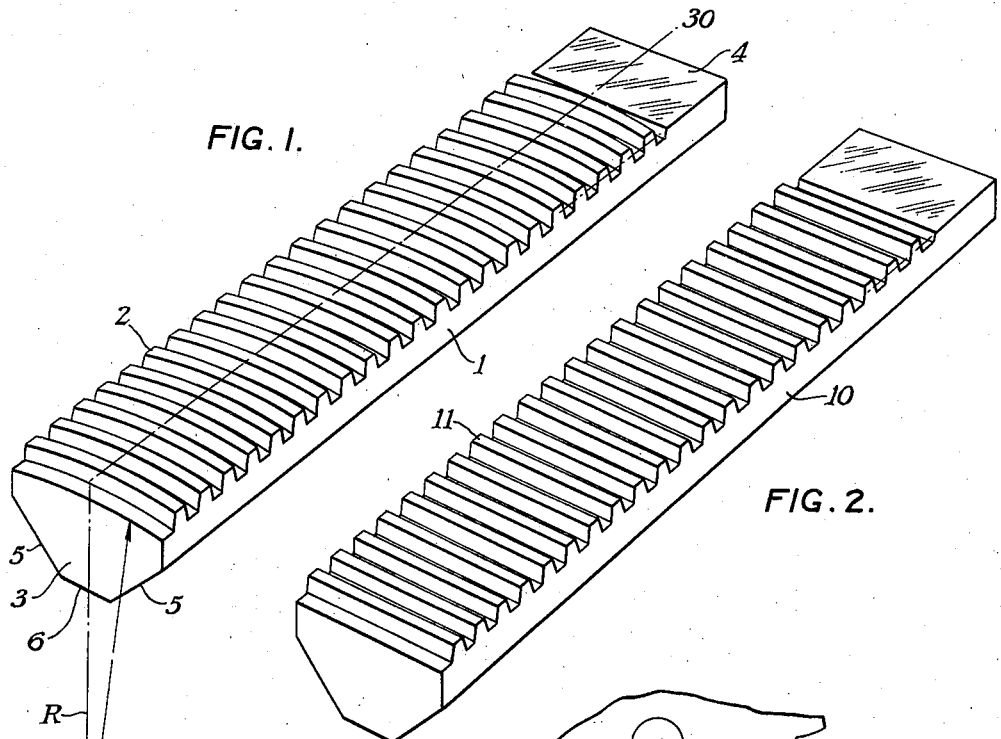
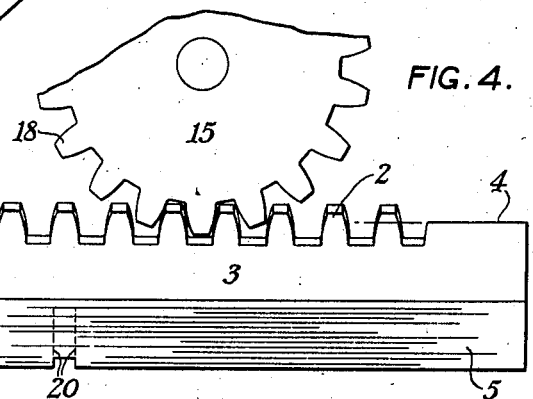
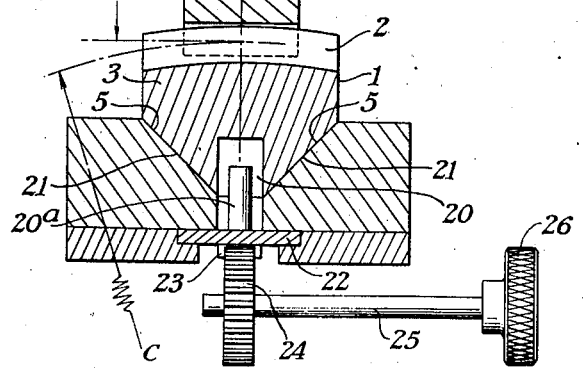
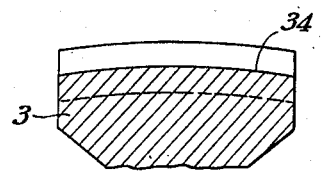
LOUIS D. MARTIN
INVENTOR
BY
ATTORNEYS.

Patented June 6, 1944

2,350,788

UNITED STATES PATENT OFFICE 2,350,788

GEAR TESTING TOOL

Louis D. Martin, Rochester, N. Y., assignor to Eastman Kodak Company, Rochester, N. Y., a corporation of New Jersey Application March 4, 1943, Serial No. 478,043

3 Claims. (Cl. 33—179.5)

This invention relates to a tool for testing the accuracy of gears and for testing the accuracy of individual gear teeth. One object of my invention is to provide a tool which can be made with a much higher degree of accuracy than known types of gear measuring tools. Another object of my invention is to provide a tool which will be a mate or conjugate of all gears of a gear system regardless of the particular tooth form system used. Another object is to provide a simple form of gear measuring tool which will have only line contact with the teeth of a gear to be measured and which can be so used that contact may be made with any portion of gear teeth throughout their length by shifting the gear being tested relative to the testing rack or worm section.

In known types of gear testing apparatus a gear may be measured with an exceedingly accurate master gear which is usually held within five ten-thousandths of an inch of the theoretically perfect dimensions. By running a gear to be measured with a master gear irregularities can be measured by determining the variation between the center of the gear and the master gear. It has also been proposed to test a gear by means of a rack, the teeth of which are accurately built up of separate pieces and mounted on a base as accurately as possible. However, in both these measuring instruments, while quite accurate work can be done, it is nevertheless not possible to maintain a tooth form and shape closer than approximately three to five ten-thousandths of an inch, and it is also difficult to test a gear for eccentricity closer than five ten-thousandths of an inch.

I have found that if a rack-like member which is actually a worm section is used, a far higher degree of accuracy can be maintained because the teeth of such a rack section can be ground and each tooth theoretically forms only a section of a single helical tooth of large diameter and of extremely small lead angle. Thus, it is possible to grind worm teeth much more accurately than the teeth of a true rack can be formed, by milling or by building up a rack out of separate teeth. A testing instrument far more accurate than those now in general use can thus be produced.

There are many advantages in utilizing a worm section which appears to be much like a standard rack, although it differs from a rack in having both tooth curvature and tooth lead. One of the advantages is that the teeth of a worm section can be easily ground in such a small size that it would be extremely difficult to mill teeth with a high degree of accuracy of a similar size on a rack. Another advantage is that in testing a gear it is desirable to provide an accurate tooth contact through only one longitudinal plane passing through the worm section rather than throughout the length of the gear tooth because this enables an operator, by shifting the gear relative to the worm section, to test the gear through any plane at right angles to the teeth, which may be desirable. Thus, with such a testing device it is possible not only to test the gear for pitch diameter, eccentricity or run out, and uniformity of tooth formation as a whole, but to test any particular part of any individual tooth of a gear. Another advantage is that the master worm section may wear in use and the teeth may be readily reground at a small fraction of the cost of the original worm section; whereas if a circular master gear or a rack were used recutting the teeth would be an extremely expensive job even if it could be successfully accomplished. The difficulty of cutting straight rack teeth is that the indexing mechanisms of machines used for such purposes do not in themselves have the desired degree of accuracy, so that it is practically impossible to reproduce a plurality of teeth of identically the same size and spacing. Where a worm section is used, since each tooth is actually only a small section of a single worm tooth of very large diameter and of small lead angle, each tooth must necessarily be identical.

Coming now to the drawing in which like reference characters denote like parts throughout:

Fig. 1 is a perspective view of a gear testing tool constructed in accordance with and embodying a preferred form of my invention;

Fig. 2 is a view similar to Fig. 1 but showing a true rack rather than a worm section as indicated in Fig. 1;

Fig. 3 is a schematic fragmentary detail section showing the relationship of the worm section tool to a gear in testing;

Fig. 4 is a schematic fragmentary side elevation of a portion of my improved testing tool and a gear being tested; and Fig. 5 is a fragmentary detail section through an accurately formed testing block on the end of a testing tool and constructed in accordance with a second embodiment of my invention.

I prefer to provide a tool for testing gears which may closely resemble a rack but which is not a true rack. Thus the tool 1 shown in Fig. 1 may be composed of a plurality of teeth 2 having both transverse curvature and lead, these teeth being formed on a bar 3 which is preferably provided with a pad 4. The bar 3 is preferably provided with converging side walls 5 and may have a flat bottom wall 6. Thus the bar 3 may have roughly a V-shaped form in cross-section. In this drawing the transverse curvature of the teeth 2 has been purposely exaggerated so that it may be more readily distinguished from a true rack more clearly shown in Fig. 2.

As shown in Fig. 2 a rack which may have milled teeth 11 is formed on a bar 10, these teeth all being arranged in a single plane laterally and having no transverse curvature and, in addition, no lead. Otherwise the rack may look similar to the worm section of Fig. 1 and, in fact, such a rack may actually be used where the need for the highest degree of accuracy is not present. It is obvious that such a rack cannot be cut or milled with anything like the accuracy that the teeth of a worm section may be ground and that, because of the difficulty of indexing and the inaccuracy of indexing machines when the rack teeth 11 are milled, they will invariably be found to have minor inaccuracies in tooth spacing and tooth formation due to the machine on which they are made.

In using a worm section rack, as shown in Fig. 1, I prefer to mount a gear 15 to be tested on a gear holder 16 including a shaft 17 for supporting the gear. As will be noticed from Fig. 3, the teeth 18 of the gear are straight transversely so that when this gear is meshed with the worm section tool 1, the pitch diameter of the gear will mesh properly with the worm section gear 2 only upon a single plane passing through the radius R of the gear teeth.

This has quite a number of advantages. In the first place the most accurate known way of gauging is to have point contact between the member being gauged and the gauging tool. In the second place it enables an operator to test various areas of any individual teeth 18 of the gear 15 by moving the gear support 16 back and forth as indicated by the arrow 19. Thus, any portion of the teeth 18 throughout their length may be accurately tested. If desired, it is also possible to tilt the shaft 17 carrying the gear to be tested about a center point P as indicated by the lines L, this movement or a combination between this movement and the back and forth movement of the gear carrier 16 readily permits any portion of the gear teeth 18 to be tested.

The testing is preferably carried out by moving the bar 3 upon the rails 5 which mate with corresponding and inverted V-shaped rail members 21. The bar 3 preferably includes an element consisting of spaced walls 20 by which it may be moved on its slideway. A pin 20a may engage the spaced walls 20 and this pin may be carried by a slide 22 carrying a rack 23 meshing with a gear 24 on a shaft 25 which may be turned by a knob 26. Thus, by turning this knob, the worm section bar 3 may be moved back and forth a sufficient distance to engage all of the teeth 18 of a gear being tested 15, and by noting the variation in the distance D between the center of the gear 15 being tested and the pitch diameter of the work section rack imperfections in the gear can readily be found.

I propose to provide a machine which can conveniently utilize the worm section shown in Fig. 1 for testing gears and such a machine may be found in my copending application Serial No. 478,044, filed Mar. 4, 1943.

I prefer to provide a test block or pad 4, as indicated in Figs. 1 and 4, this pad preferably having a definite relation to the pitch diameter of the worm section teeth 2. I find it convenient in the form of my invention shown in Fig. 1 to have the top of the pad 4 positioned on the pitch line of the teeth 2 in a plane passing through the center of the teeth and diagrammatically illustrated by the line 30 in Fig. 1. However, there are certain advantages in forming the pad 34 as shown in Fig. 5 wherein this pad is curved transversely in a similar manner to the curvature of the teeth 2 and so that the top of the pad is on a line parallel to the pitch diameter of the worm section. It may be desirable in some instances to move this pad either closer or further away with respect to the bar 3 for some particular work, but in any event this pad 34 should bear a definite relationship to the pitch line so that it can be readily used in checking radius or the pitch diameter of the gear being tested.

One of the many advantages of a tool for testing gears constructed in accordance with my invention is that worm sections can readily be provided with excessively small and fine teeth. In the drawing I have purposely exaggerated the size of the teeth of the worm section 1 and the transverse curvature thereof to more readily indicate the difference between a worm section and a true rack. Since the difficulty of milling excessively accurate teeth greatly increases with the size of the teeth—the smaller the teeth the more difficult to get accurate size, shape, and spacing—it is possible with my invention to make worm sections having teeth which are accurately formed of a much smaller size than a rack could be formed, even though it is admitted that rack teeth can never be formed with the degree of accuracy of the teeth of a worm section.

The above-described worm section tool can be used for checking helical as well as spur gears, both right and left hand. It can be used for checking a gear with thin teeth which would ordinarily bottom in the teeth of the master, by altering the regular setting of the gear relative to the worm section tool which has the effect of thickening the teeth of the worm section tool.

I have illustrated and described a preferred embodiment of my invention in which a typical worm section rack-like tool is indicated on a somewhat exaggerated scale. I wish to particularly point out, however, that the curvature of the teeth, the lead, the width of the rack, the length of the rack, and the dimensions of the testing tool as well as the shape thereof will necessarily have to be altered to vary the particular testing tool for the work to be done with it. It is quite clear that the larger the gear, the longer the rack will have to be if all of the teeth of the gear are to be tested as is customary for precision work. While I have shown the teeth of the testing tool to be considerably longer than the teeth of the gear, this is not necessary but is merely a matter of convenience. I consider as within the scope of my invention all such worm section rack-like members that may come within the scope of the appended claims.

I claim:

1. A tool for use in measuring the accuracy of gears comprising an elongated generally rack-shaped bar, including teeth having the form of a worm section with both transverse curvature and lead, said rack-shaped bar including a supporting portion below the teeth substantially V-shaped in cross-section, and a coupling member in the V-shaped portion of the rack-shaped bar.

2. A tool for use in measuring the accuracy of gears comprising an elongated generally rack-shaped bar, including teeth having the form of a worm section with both transverse curvature and lead, and an accurately formed pad adjacent the teeth having a predetermined relation to the pitch line of the teeth.

3. A tool for checking gears comprising a worm-section generally resembling a rack, said worm-section teeth having a transverse curvature about a relatively long radius and a small lead angle, and a test block included in the tool of a height equal to the pitch line of the teeth.

LOUIS D. MARTIN.